(12) United States Patent  
Nakazawa

(10) Patent No.: US 7,041,957 B2  
(45) Date of Patent: May 9, 2006

(54) OPTICAL RECEIVER

(75) Inventor: Atsushi Nakazawa, Osaka (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/864,882

(22) Filed: Jun. 10, 2004

(65) Prior Publication Data

US 2005/0001151 A1 Jan. 6, 2005

(30) Foreign Application Priority Data

Jun. 12, 2003 (JP) ............ P.2003-168307

(51) Int. Cl.
*H01J 40/14* (2006.01)
(52) U.S. Cl. ................................. 250/214 R
(58) Field of Classification Search ............ 250/214 R, 250/214 AG, 214 C; 327/513, 514
See application file for complete search history.

(56) References Cited

U.S. PATENT DOCUMENTS 6,313,459 B1 * 11/2001 Hoffe .............. 250/214 R

FOREIGN PATENT DOCUMENTS

JP 2003-69500 3/2003

* cited by examiner

Primary Examiner—Thanh X. Luu
Assistant Examiner—Tony Ko
(74) Attorney, Agent, or Firm—McDermott Will & Emery LLP

(57) ABSTRACT

A control circuit refers to a time schedule of a time slot assigned to each of slave stations, which is stored in a first storage, and an optical intensity of each of signal packets sent from the slave stations, which is stored in a second storage, and preliminarily knows when and from what slave station an upstream signal packet is received and the optical intensity of the upstream signal packet to be received. When the control circuit determines the optimum bias voltage of an APD, in an interval between signal packets, a bias control circuit provides a bias source with a timing signal, by which an output voltage of the bias source is changed, and a bias voltage setting signal. The bias source applies a bias voltage corresponding to the bias setting signal sent to the APD with the optimum timing synchronized with the timing signal.

8 Claims, 10 Drawing Sheets

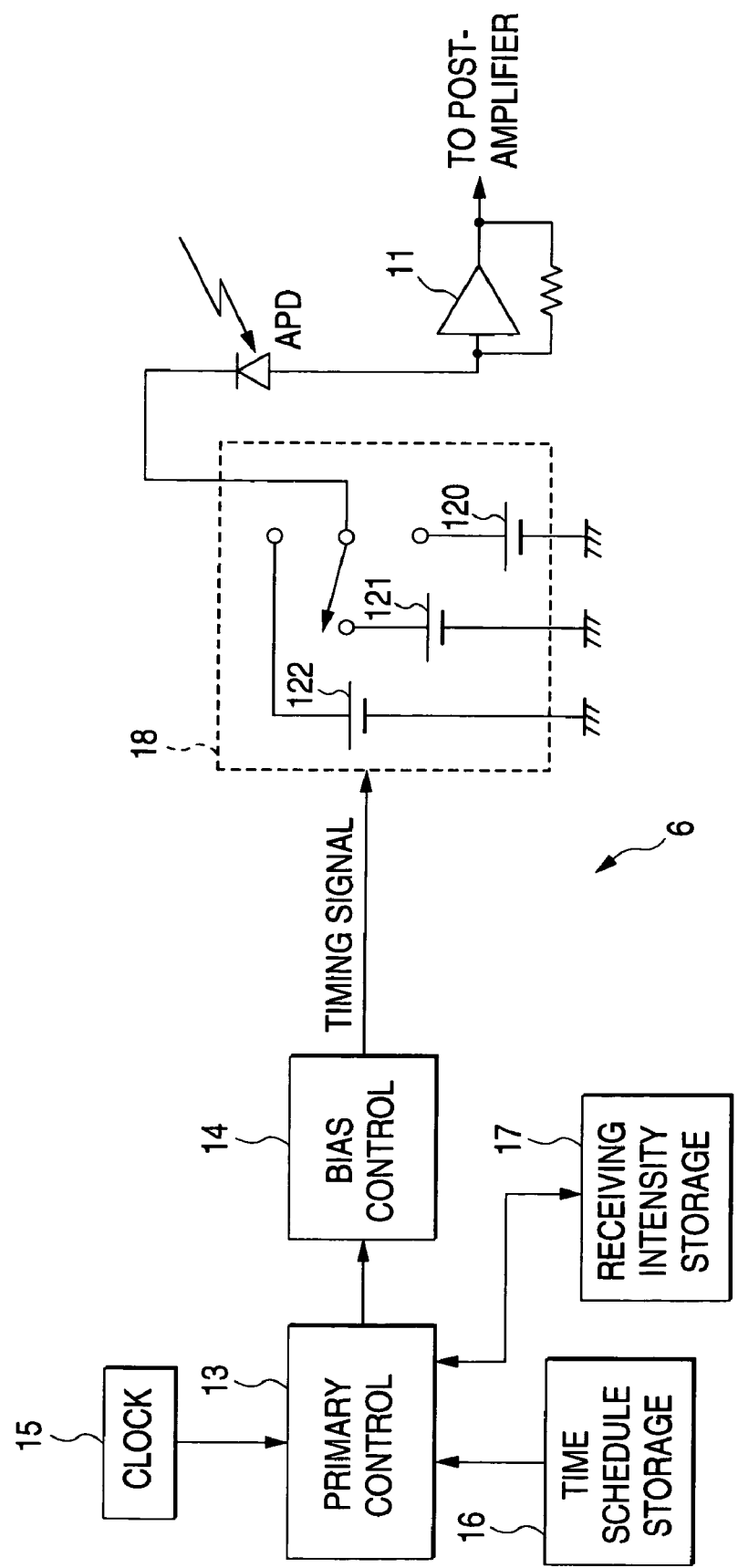

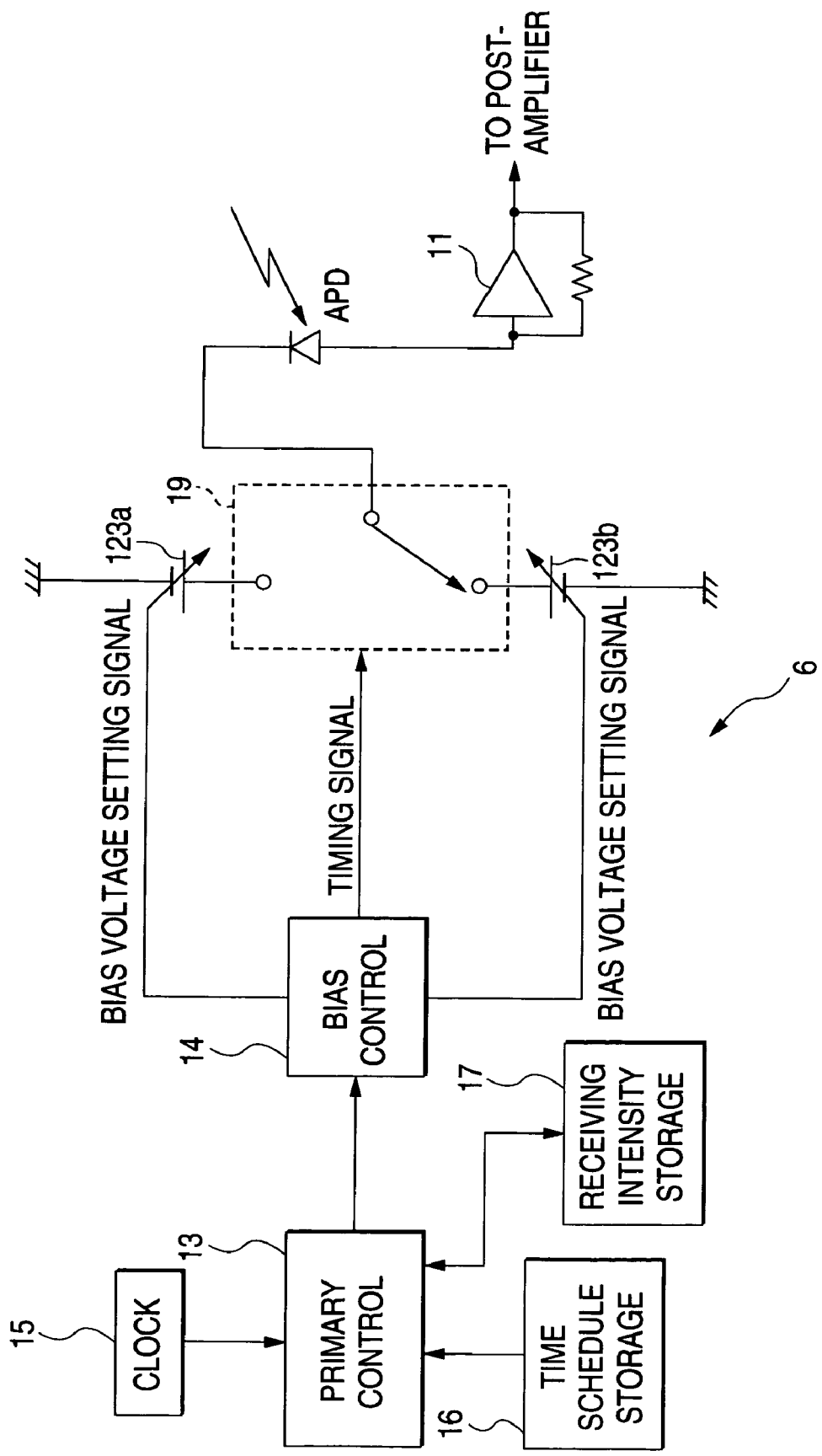

OPTICAL RECEIVER

BACKGROUND OF THE INVENTION

1. Field of the Invention

The present invention relates to an optical receiver to be applied to an optical communication system, in particularly, related to an optical receiver using an avalanche photodiode (APD).

2. Related Prior Art

A PON (Passive Optical Network) system is well known to perform two-way optical communication between a master station and a plurality of slave stations. Between the master station and the plural stations in the PON system, optical fibers and optical branching devices are provided. The master station sends, in one time, an instruction to the slave stations, which includes a timetable. The slave stations, based on the timetable, sequentially send upstream signals to the master station.

The avalanche photodiode (APD) is typically used an optical receiver in the master station because the APD has a photo-multiplication characteristic, and accordingly, the APD may respond to a weak optical signal. However, when a large optical signal enters the APD biased at a high voltage, the APD easily saturates, and occasionally the APD may be destroyed by the photo-carrier generated by itself. The carrier-multiplication strongly depends on the reverse bias voltage applied thereto. Thus, in the optical receiver, control of the bias voltage must be necessary such that the bias voltage is to be large for weak optical signals and to be small for large optical signals.

Self-biased optical receiver using a current feedback effect is well known, in which a resistor is connected in series between the APD and the bias voltage source. In this configuration, when the large optical signal is input, and the APD generates a large current, the voltage drop at the resistor connected in series to the APD becomes large, which reduces the bias voltage applied to the APD.

Another configuration of the optical receiver using the APD is disclosed in JP-A-2003-069500, in which the optical receiver monitors not only the intensity but also the bit error rate of the upstream signal, and adjusts the bias voltage to the APD thereby.

However, in the self-bias type optical receiver, the bias voltage is set with a time lag due to parasitic capacitance, accordingly, the optical receiver having the self-bias configuration may not follow the steep reduction/enhancement of the intensity of the optical signal sequentially received thereby.

Further, in the configuration disclosed in the Japanese patent listed above, the optical receiver there in may not follow the optical signals with a short time interval (about 1 ns), because the bit error must be measured within a substantial period, and the feedback loop has a time constant.

SUMMARY OF THE INVENTION

Accordingly, one object of the invention is to provide an optical receiver using an avalanche photodiode (APD), which can follow optical signal packets with different intensity and sequentially sent from various optical transmitters. According to one aspect of the present invention, an optical receiver includes an APD, a bias source, and a control circuit. The APD receives the optical signal packets with an optical sensitivity. The bias source outputs a variable output to the APD as a bias voltage. The control circuit outputs a timing signal synchronized with the optical signal packet and a bias setting signal to the bias source. Accordingly, the optical sensitivity of the APD is optimized within the signal packet by the various output of the bias source.

According to one preferable configuration, the bias source may include a plurality of voltage power supplies, which have different voltages to each other. The bias setting signal transmitted from the control circuit selects, in synchronous with the signal packet, one of the voltage power supplies to optimize the optical sensitivity of the APD.

According to another configuration of the invention, the bias source may include first and second voltage supplies, both having a variable output. The bias setting signal setting sets the variable output of the second voltage power supply to be a predetermined voltage during the timing signal choosing the first voltage power supply. The timing signal chooses, in synchronous with the signal packet, the second voltage power supply to output the predetermined voltage, and the bias setting signal sets the variable output of the first voltage power supply to be a next voltage. The timing signal switches, in synchronous with the signal packet, the first voltage power supply to output the next voltage, and iterates the aforementioned process, whereby the output of the bias source, namely the bias voltage applied to the APD, can be optimized to each of signal packets.

The optical receiver of the present invention may include first and second storages with in the control circuit. The first storage stores a time schedule of the signal packets, while the second storage stores optical intensity of the signal packets Thus, the control circuit can generate the timing signal and the bias voltage setting signal based on the time schedule and the optical intensity.

According to another aspect of the present invention, a method is provided for optimizing an optical sensitivity of the APD used in the optical receiver of PON network system. The APD receives optical signal packets, each corresponding to an individual optical transmitter, having different optical intensity, and being sequentially sent from the individual transmitter. The optical receiver includes a bias source and a control circuit. The bias source outputs a variable output voltage to the APD as a bias voltage thereto. The control circuit outputs a timing signal synchronized with the signal packet and a bias setting signal to the bias source. The method of the present invention comprises steps of, (a) preliminarily defines an optimum bias voltage and sequence to transmit the optical signal packet fro each optical transmitter, and (b) sets the bias setting signal to the bias source in synchronous with the timing signal. Thus, the APD is biased in optimum with respect to each signal packet by the bias source.

BRIEF DESCRIPTION OF THE DRAWINGS

FIG. 6 is a block diagram of the optical receiver with another configuration;

FIG. 8 is a block diagram of the optical receiver with another configuration;

DETAILED DESCRIPTION OF THE INVENTION

Figure 1:
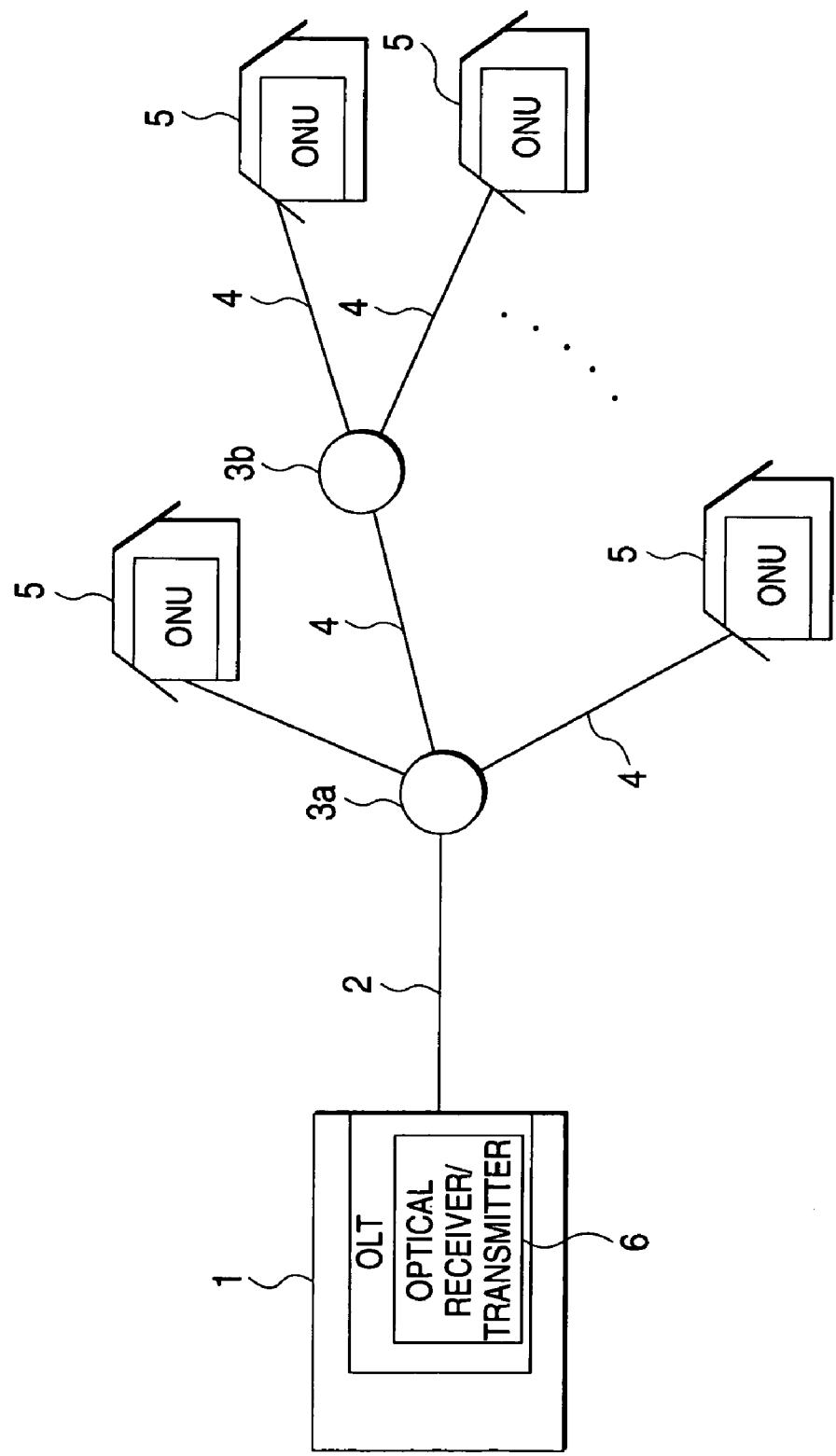
FIG. 1 is a schematic view illustrating an example of a PON system to which an optical receiver according to the present invention is applied.

Hereinafter, embodiments of the invention are described in detail with reference to the accompanying drawings. FIG. 1 is a schematic view illustrating an example of a PON system to which an optical receiver according to the present invention is applied. An apparatus provided in a central station is referred to as a master station or master station unit. An apparatus installed in a subscriber is referred to as a slave station. The PON system has a master station 1, plural slave stations 5, and optical branching devices 3a and 3b. A trunk line fiber 2 connects the master station 1 to the optical branching device 3a. Branch line fibers 4 connect the optical branching device 3a to another branching device 3b, the optical branching device 3a to the slave station 5, and the optical branching device 3b to the slave station 5, respectively.

A downstream optical signal sent from the master station 1 to the slave station 5, and an upstream optical signal set from the slave station 5 to the master station 1, have a packet form. The master station 1 has an optical line terminal (OLT) connected to the trunk line fiber 2, a layer-2 switch, and a broadband access router connected to a higher-level network. The OLT includes an optical receiver 6 for receiving an upstream signal packet sent from the slave station 5, and includes an optical signal transmitter for transmitting a downstream packet to the slave station 5.

The master station 1 has functions to transmit a signal packet sent from the higher-level network, such as the Internet, to the slave station 5, and to send a signal packet received by the optical receiver 6 to the higher-level network. Each of the slave stations 5 may have a personal computer installed in the subscriber's house, and an optical network unit (ONU) for transmitting a broadband optical signal generated by the personal computer to the optical fiber and for receiving a broadband optical signal to be used by the personal computer from the optical fiber.

An operation of the PON system is briefly described. In the master station 1, the layer-2 switch performs a predetermined process on a downstream signal packet supplied from the higher-level network thereto. Then, an optical signal is transmitted to the slave stations 5 in a same time by the optical transmitter via the optical fibers. This transmitted optical signal is branched at the optical branching devices 3a and 3b. Subsequently, the branched optical signals are reached to the slave stations 5 connected to the optical branching devices 3a and 3b. The slave station, an address of which is matched with a destination address contained in the transmitted signal packet, captures the optical signal and decodes the signal packet.

On the other hand, the upstream signal packets are transmitted from the slave stations 5 to the master station 1 via the optical branching devices 3a and 3b. In the master station 1, the optical receiver 6 receives the signal packets.

Then, the layer-2 switch performs a predetermined process on the signal packet. Thereafter, the signal packet is transmitted to the high-level network via the broadband access router.

It is necessary to prevent the upstream signal packets from colliding with each other. Thus, when downstream signal packets are transmitted to the slave stations 5, a time slot, assigned to each of slave stations 5, is put in the downstream packet signal. The slave station 5, to which the time slot is assigned, transmits an upstream signal packet at the assigned time slot. Therefore, the collision of the upstream signal packet is avoided. It is preferable that a clock is shared between the master station 1 and each of the slave stations 5. However, the adjustment of the clock can be performed by putting information of time in the signal packet when communicated therebetween.

Thus, the master station 1 can sequentially receives the upstream signal packet from the slave stations 5. However, the intensities of the optical signal depend on the optical paths from the slave station 5 to the master station 1. Also, the intensity of the optical signal depends on how many branching devices are placed on the optical path.

Figure 2:
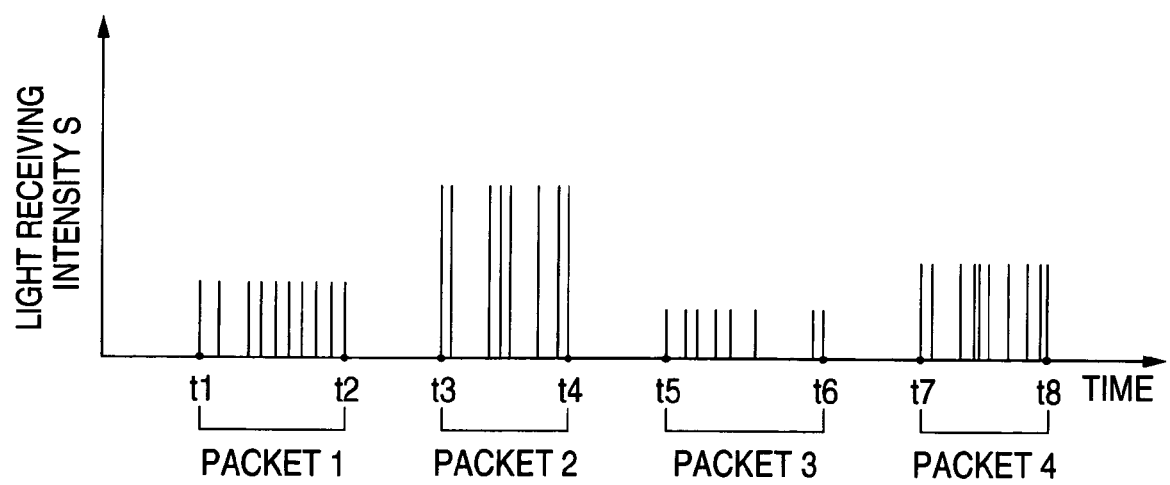
FIG. 2 is a schematic view showing the difference in the optical intensity of upstream signal packets from slave stations.

FIG. 2 is a schematic view showing the difference in the optical intensity of the upstream signal packets from the slave stations 5. The horizontal axis represents time, while the vertical axis represents the optical intensity.

The receiver 6 receives packet 1, packet 2, packet 3 and packet 4. The optical intensity differs in packet 1 to packet 4. The signal frequency, one unit cycle of on/off signal within each of signal packets, is about 1 nanosecond.

Figure 3:
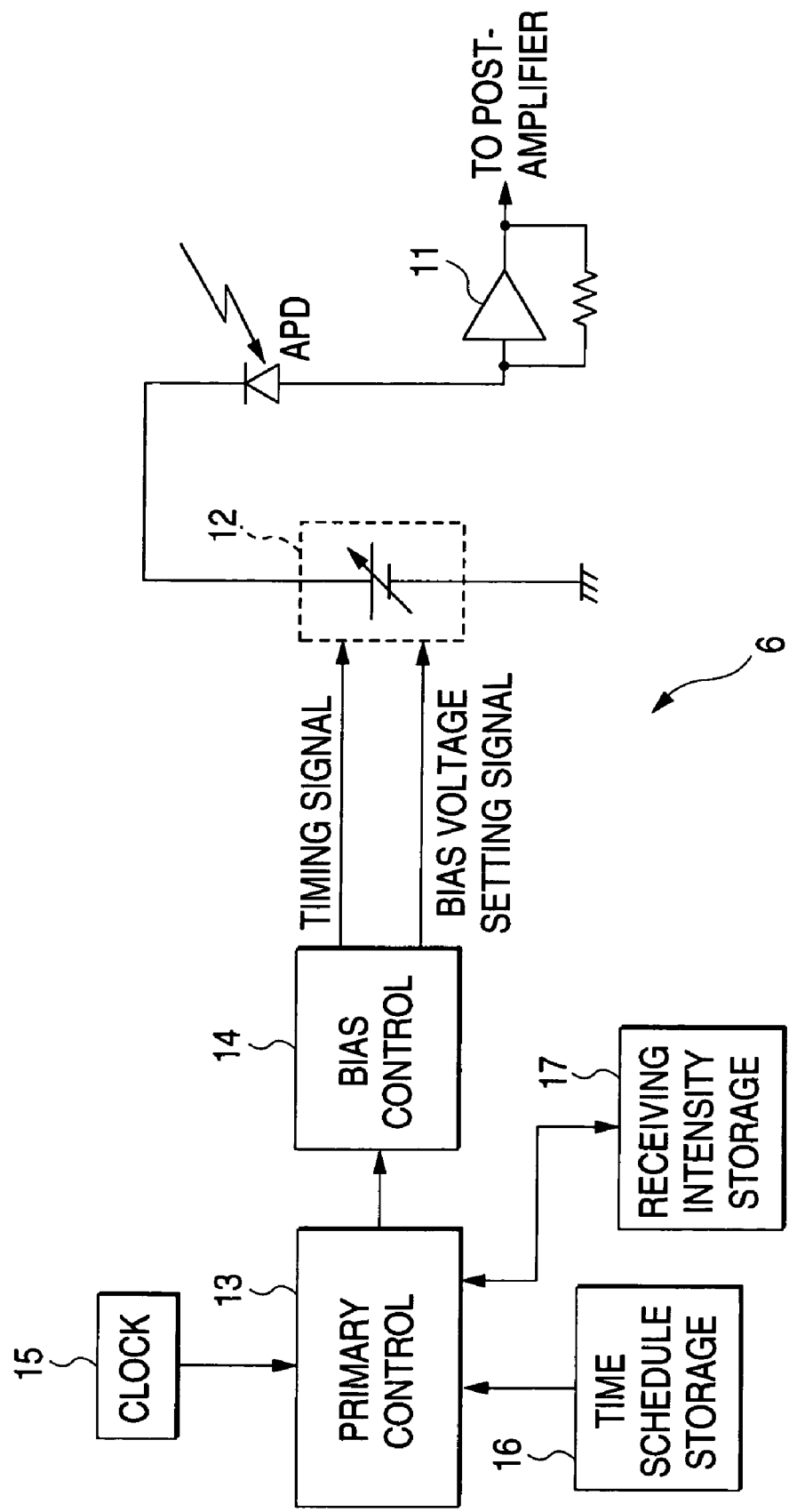
FIG. 3 is a block diagram of the optical receiver according to the present invention.

FIG. 3 is a block diagram of the optical receiver according to the present invention. The optical receiver 6 includes an avalanche photodiode (APD) for receiving the upstream optical signal. An electrical current generated in the APD and converted to a voltage by a trans-impedance amplifier 11 is input to a post amplifier. The optical receiver 6 further includes a bias source 12 for providing a bias voltage to the APD, and a control circuit 13 for controlling the optical sensitivity of the optical receiver 6.

The optical receiver further includes a bias control circuit 14 for controlling the bias voltage of the APD, a clock 15 for synchronizing the timing of the signal packet, by which the signal packet sent form the slave station 5 is received, a first storage 16 for storing the time schedule of the time slot assigned to each of slave stations 5, and a second storage 17 for storing the optical intensity of each of signal packets sent from the slave stations 5. The operation of the control circuit 13, the bias control circuit 13, the clock 15, the first storage 16, and the second storage 17 are carried out by a computer.

The control circuit 13 preliminarily measures the optical intensity of the signal packet and stores the measured intensity in the second storage 17. The measurement timing is optional, for example, when the PON system is established, or when the slave station 5 is initialized. A measuring method is to fix the bias voltage of the APD at a certain value, to measure the current generated by the APD, and then to determine the optical intensity according to the characteristic of the APD.

The control circuit 13 refers to the time schedule stored in the first storage 16 and to the optical intensity stored in the second storage 17, and preliminarily knows when and from what slave station 5 the upstream signal packet is received, and the optical intensity of the upstream signal packet to be received.

Figure 4:
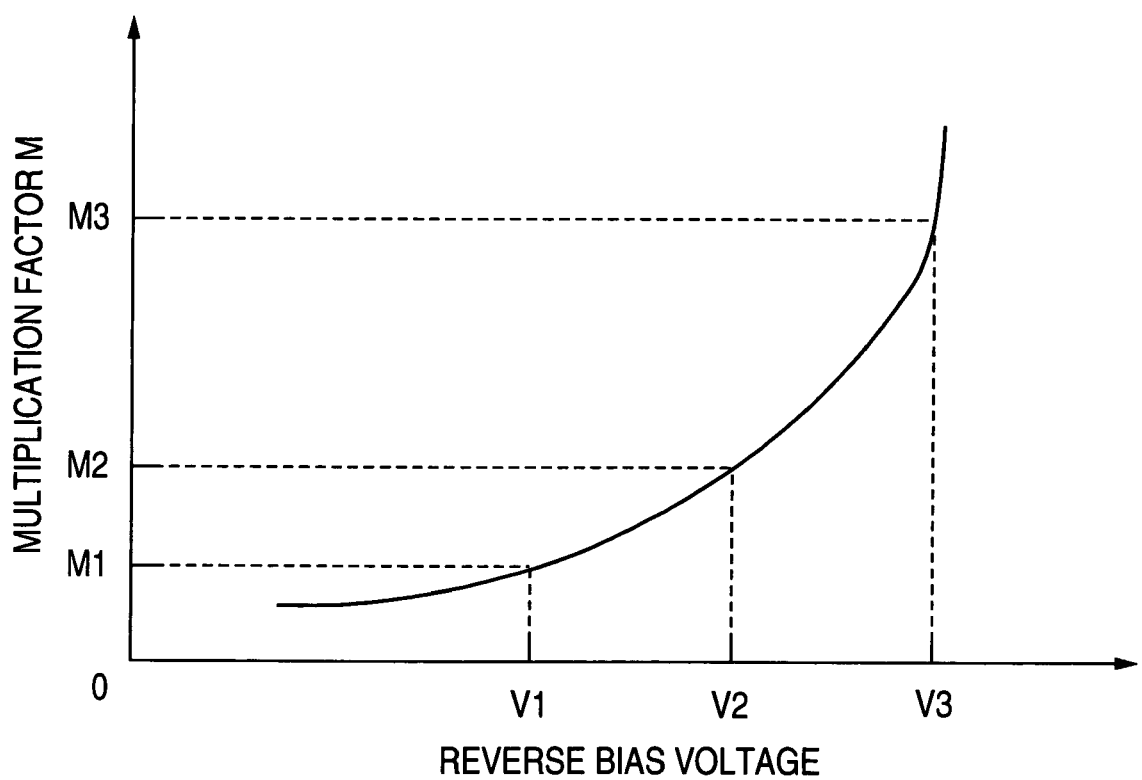
FIG. 4 illustrates the relation between a multiplication factor M and a reverse bias voltage of the APD.

FIG. 4 illustrates the relation between the multiplication factor M and the reverse bias voltage of the APD. The multiplication factor M is set to be large for weak optical signals, and to be small for large optical signals. Thus, the control circuit 13 has a look-up table defining the relation between the optical intensity and an optimum bias voltage of the APD. When the multiplication factor M of the APD is to be set at M1 in FIG. 4, the control circuit 13 determines the optimum bias voltage to be V1. When the multiplication factor of the APD is to be set at M2, the control circuit 13 determines the optimum bias voltage to be V2, and so on.

When the control circuit 13 determines the optimum bias voltage of the APD, the bias control circuit 14 sets the optimum bias voltage for the upstream signal packet received from the specific one of the slave station 5. Practically, in an interval between signal packets, for instance, between t2 and t3, the bias control circuit 14 provides the bias source 12 with a timing signal, by which an output voltage of the bias source is changed, and a bias voltage setting signal.

Figure 5:
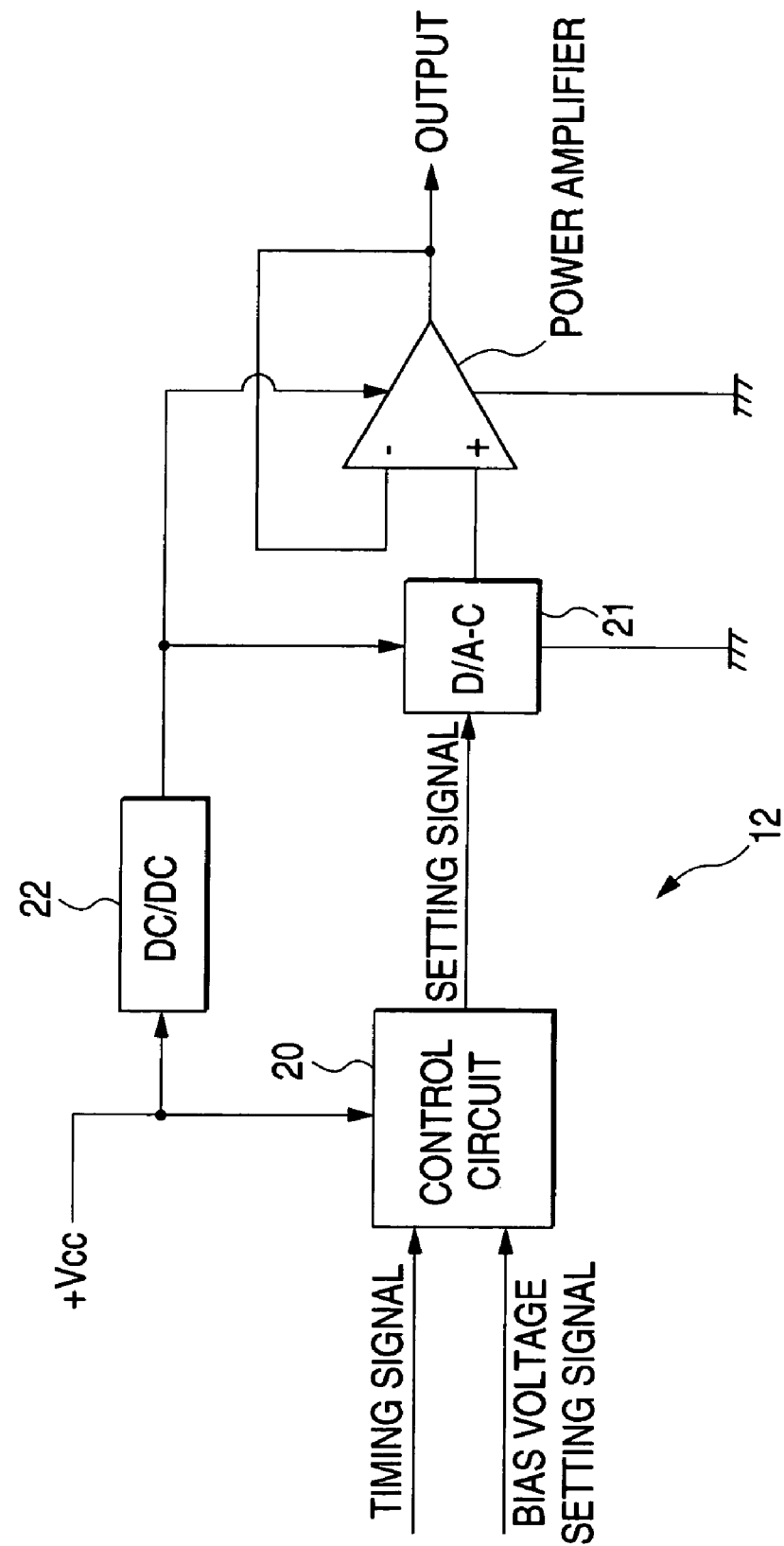
FIG. 5 is a block diagram of a bias source of the optical receiver shown in FIG. 3.

FIG. 5 is a block diagram of the bias source 12. The bias source 12 includes a control circuit 20, a digital-to-analog converter (D/A-C) 21 for converting the bias voltage setting signal into an analog form, and a powe ramplifier 23 for buffering the bias voltage. A voltage output from the power amplifier 23 is applied to the APD as a bias voltage.

The bias source 12 further includes a DC/DC converter (for example, LT1930/LT1930A of Linear Technology Cooperation) 22 for converting a line voltage (generally, 3.3V or 5V) of the bias source 12 to an input of the D/A-C 21 and an input of the power amplifier 23. In this circuit, the bias voltage corresponding to the bias setting signal sent from the bias control circuit 14 is applied to the APD with the optimum timing synchronized with the timing signal. Accordingly, when the upstream signal packet is received from the specific slave station 5, the bias voltage, at which the optical sensitivity is optimized, is supplied to the APD.

Thus, the optical receiver 6 can receive the upstream optical signal at the optimal sensitivity. This receiver 6 can process optical signals having various intensity. Accordingly, the APD can receive optical signals with a certain signal-to-noise ratio (S/N ratio) and without any saturation thereof.

FIG. 6 is a block diagram of the optical receiver with another configuration. In this receiver, a switching circuit 18 selects one of voltage power supplies 120, 121, and 122, each outputting different voltages. The control circuit 13 stores the voltage values of the power supplies 120 to 122, and compares the optical intensity for the slave stations 5 to the stored values, thereby determining one power supply that can provide the optimum bias voltage to the APD. The bias control circuit 14 sends a switch timing signal used for synchronizing the selection of power supplies 120 to 122 with the packet. Accordingly, the power amplifier provided in the previous embodiment may be eliminated in the present optical receiver 6. The circuit of respective power supplies 120 to 122 can be simplified. However, when the bias voltage of the APD is finely adjusted, many power supplies may be necessary.

Figure 7A:
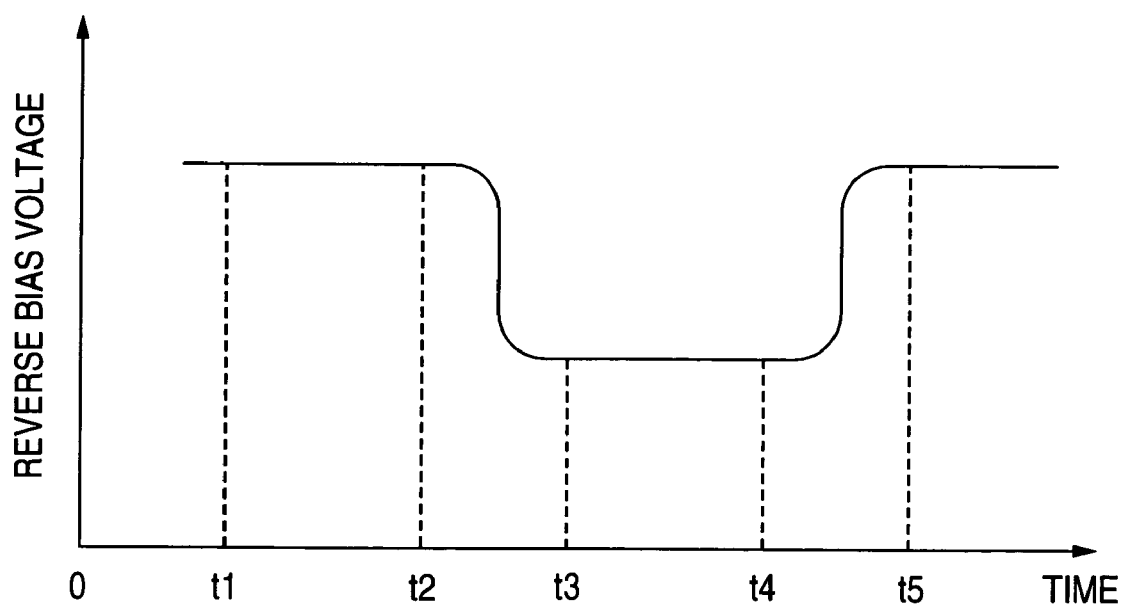
FIG. 7A illustrates a sequential behavior of the reverse bias voltage of the APD when the upstream signal packet is provided to the control circuit shown in FIG. 3.
Figure 7B:
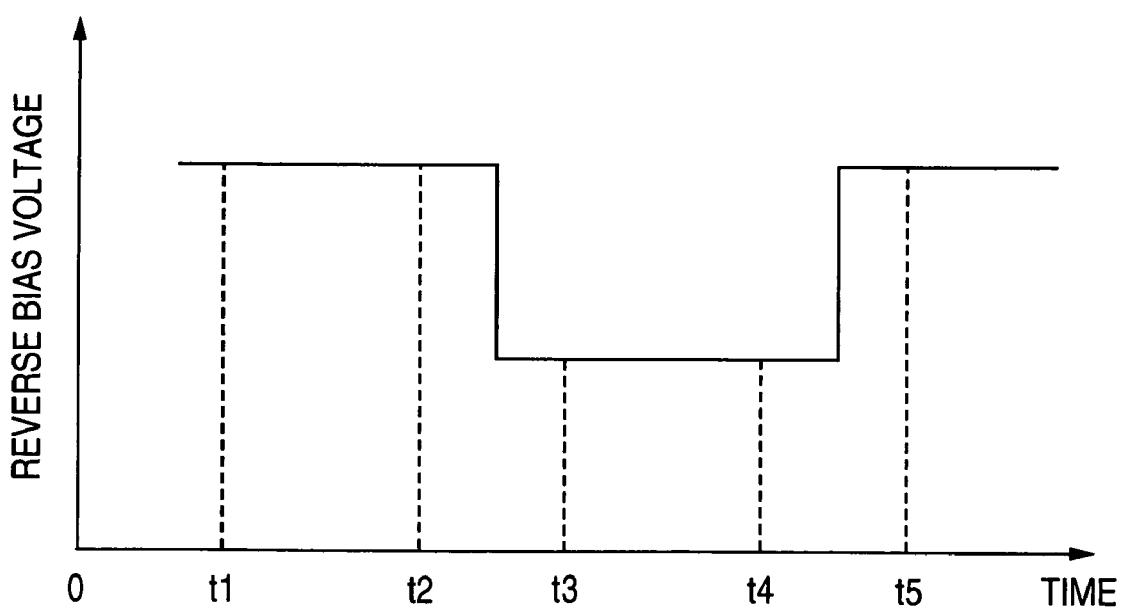
FIG. 7B illustrates a sequential behavior of the reverse bias voltage of the APD when the upstream signal packet is provided to the control circuit shown in FIG. 6.

FIGS. 7A and 7B show sequential behavior of the reverse bias voltage of the APD. FIG. 7A illustrates the case when the upstream signal packet is provided to the control circuit 13 shown in FIG. 3. FIG. 7B illustrates the case when the upstream signal packet is provided to the control circuit 13 shown in FIG. 6.

The outputs of the power supplies 120 to 122 shown in FIG. 6 are maintained in constant. The stable bias voltage is instantaneously applied to the APD by selecting the power supplies with the switching circuit 18. Conversely, the output of the power amplifier 23 shown in FIG. 3 is adjusted based on the timing signal and the bias voltage setting signal. Therefore, as shown in FIG. 7A, the rise and the fall of the bias voltage are gradual.

FIG. 8 is a block diagram of another example of the optical receiver. This receiver, includes two power supplies 123a and 123b. A switch 19 chooses these two power supplies 123a and 123b. The control circuit 13 determines the optimum bias voltage V1 in synchronized with the upstream signal packet from a specific slave station. The control circuit 13 also determines the optimum bias voltage V2 in synchronized with the upstream signal packet from the next specific slave station. The bias control circuit 14 supplies the bias voltage setting signal, which is used for setting the first optimum voltage V1, to one of the power supply 123a. The bias control circuit 14 also supplies a timing signal to switch from one of the power supplies to the other.

During the upstream signal packet is received from the specific slave station, the bias control circuit 14 supplies the other power supply 123b with a bias voltage setting signal for setting the voltage at the next optimum voltage V2. Consequently, the other power supply 123b is on standby in a state the bias voltage thereof is set at V2.

After receiving the upstream signal packet from the specific slave station and before receiving the upstream signal packet from the next slave station, the bias control circuit 14 supplies the switch circuit 19 with a switch timing signal to switch the power supply 123a to the other power supply 123b. Accordingly, the output from the other power supply 123b is quickly started, and is stable because the power supply 123b has been on standby.

During the bias voltage is supplied from the other power supply 123b, the bias control circuit 14 provides the bias voltage setting signal corresponding to the next optimum voltage V3. The power supply 123a, thus set at V3, is on standby mode. The stable bias voltage can be always applied to the APD by continuing such routine.

Figure 9:
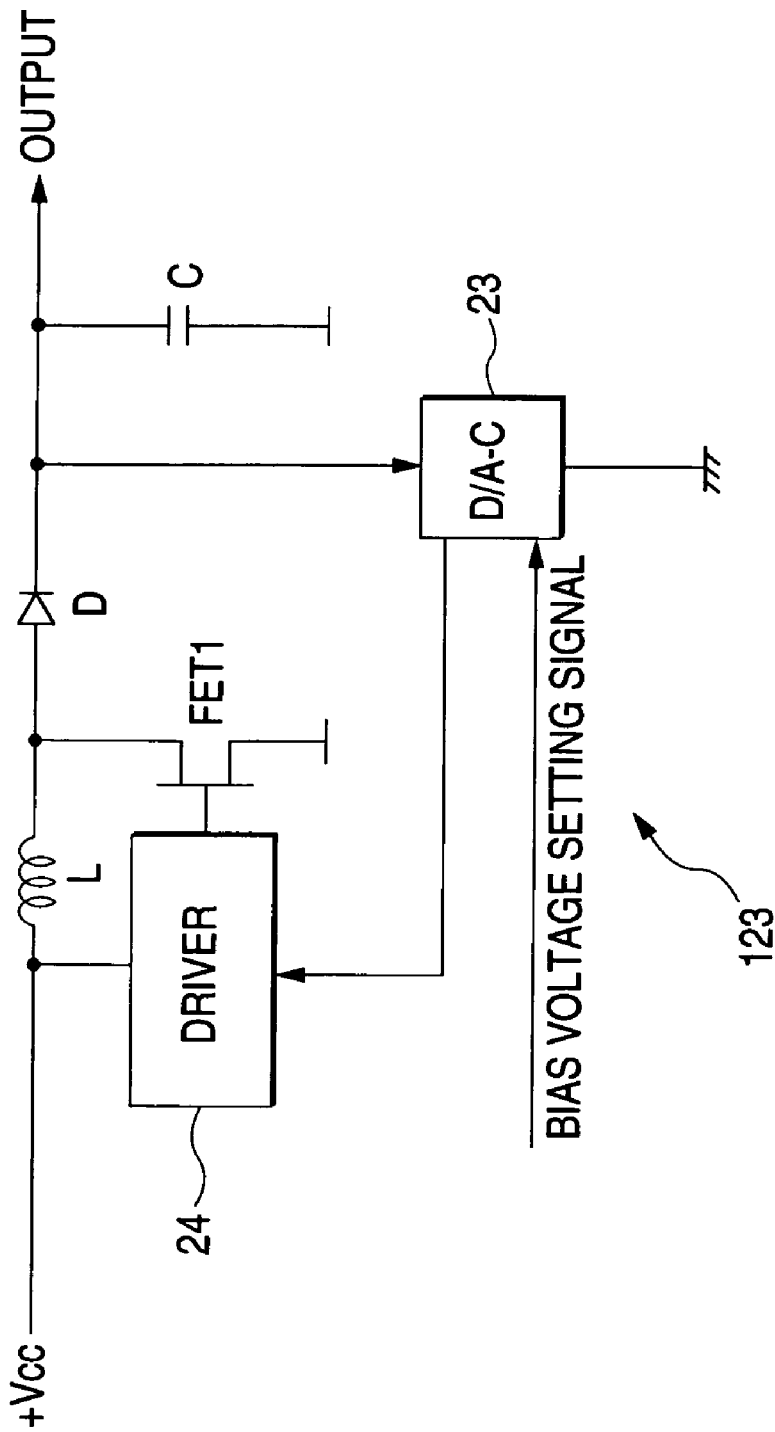
FIG. 9 is a block diagram of a power supply of FIG. 8.

FIG. 9 is a block diagram of the power supply 123, namely 123a and 123b of FIG. 8. The power supply 123 includes a digital-to-analog converter (D/A-C) 23, a driver 24, a transistor FET1, an inductor L, a diode D, and a capacitor C.

The D/A-C 23 converts the bias voltage setting signal to an analog form, and compares thus converted voltage setting signal with the output of the power supply 123. The D/A-C 23 outputs the result of the comparison to the driver 24. The driver 24, receiving the output from the D/A-C 23, drives the transistor FET1 by a pulse signal generated based on the output of the D/A-C 23. The FET1, receiving the AC signal from the driver 24, switches the line voltage Vcc (generally 5V or 3.3V). When the transistor FET1 turns on, the electromagnetic energy is stored in the inductor L. While, the stored energy in the inductor L is released at the period the transistor FET1 is tuned off, and the output of the power supply 123 becomes the voltage due to the stored energy in addition to the line voltage. Thus, the power supply 123 can output the voltage greater than the line voltage Vcc.

Figure 10:
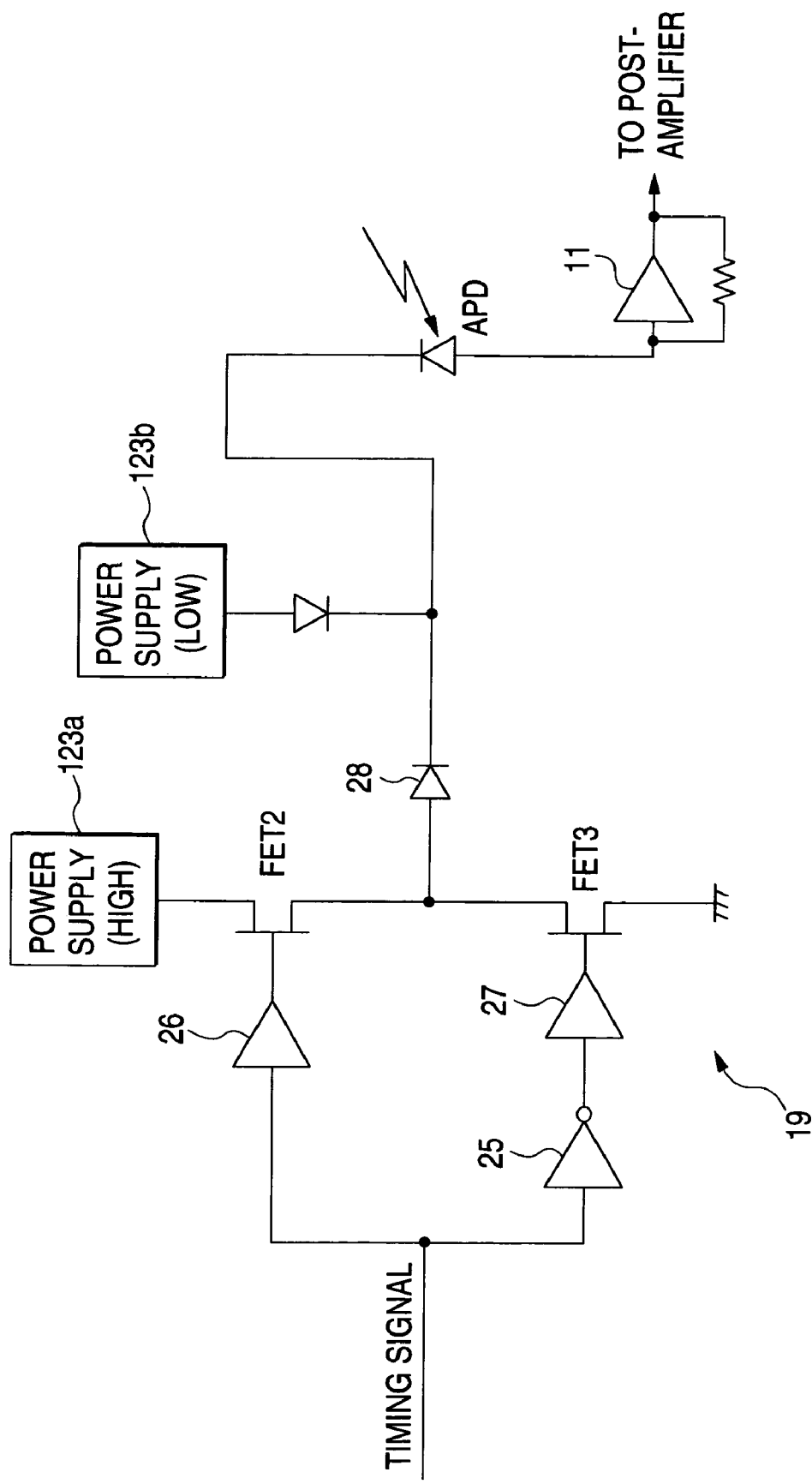
FIG. 10 is a block diagram of a switch circuit shown in FIG. 8.

FIG. 10 is a block diagram of the switch circuit 19 shown in FIG. 8. The switch circuit 19 includes amplifiers 25, 26, and 27. The amplifiers 26 and 27 are the non-inverted-mode amplifiers, while the other amplifier 25 is an inverted-mode amplifier. The circuit further includes two transistors FET2 and FET3 for switching the optimum bias voltage set in the power supply 123a and the other optimum bias voltage set in the other power supply 123b. As shown in FIG. 10, the power supply 123a and the other power supply 123b are connected to the switch circuit 19. The power supply 123a is assumed to be higher voltage than that set in the other power supply 123b.

When the switch timing signal "0" is provided to the switch circuit 19, the transistor FET2 is turned off and the other transistor FET 3 is turned on, thereby disconnecting the power supply 123a from the switch circuit 19 and biasing a diode 28 connected on a path from transistors to the APD in reverse. Thus, the lower bias voltage set in the other power supply 123b is conducted to the APD. When the switch timing signal "1" is provided to the switch circuit 19, the transistor FET2 is turned on, while the other transistor FET3 is turned off. Thus, the higher bias voltage set in the power supply 123a is applied to the APD. Because the switch circuit 19 operates as such, different bias voltage, set in the power supply 123a or in the other power supply 123b, can be supplied to the APD within a short time (about 80 nsec).

Although the embodiments of the invention have been described in the foregoing description, the invention is not limited to the embodiments. Various alterations may be made within the scope of the invention. For example, in the aforementioned embodiments, the optimum bias voltages are determined according to the intensity of the optical signal received from the slave stations, which are stored in the second storage 17. However, instead of this procedure, the receiver may be adapted such that the optimum bias voltage associated with the intensity of the optical signals sent form the slave stations are preliminary stored therein, and the bias control circuit 14 controls the bias voltage of the APD based on the stored value.

Additionally, the relation between the multiplication factor M and the reverse bias voltage of the APD varies as temperature changes. Therefore, the temperature condition may be added to the invention, similarly to the related art, in which the temperature condition is taken into consideration.

What is claimed is:

1. An optical receiver for receiving optical signal packets, each signal packet corresponding to an individual optical transmitter and having different optical intensity, said optical signal packets being sequentially sent from said individual optical transmitters, said optical receiver comprising:
    an avalanche photodiode for receiving said optical signal packets with an optical sensitivity;
    a bias source for outputting a variable output to be supplied to said avalanche photodiode as a bias voltage; and
    a control circuit for outputting a timing signal synchronized with said packets and a bias setting signal to said bias source for optimizing said optical sensitivity of said avalanche photodiode within said signal packet.

2. The optical receiver according to claim 1, wherein
said bias source includes a plurality of voltage power supplies having different output voltages from each other, and
said bias setting signal selects, in synchronous with said signal optical signal packets one of said voltage power supplies.

3. The optical receiver according to claim 1, wherein
said bias source includes a first voltage power supply and a second voltage power supply chosen by said timing signal, each voltage power supply outputting said variable output, said bias setting signal setting, during said timing signal choosing said first voltage power supply, said variable output of said second voltage power supply to be a predetermined voltage and, in synchronous with said optical signal packet, said timing signal choosing the second voltage power supply to output said predetermined voltage.

4. The optical receiver according to claim 1, wherein
said control circuit includes a first storage for storing a time schedule of said optical signal packets, and a second storage for storing said optical intensity of said optical signal packets, and
said control circuit generates said timing signal and said bias setting signal based on said time schedule and said optical intensity.

5. A method for optimizing optical sensitivity of an avalanche photodiode used in an optical receiver of a passive optical network system, said avalanche photodiode receiving optical signal packets, each signal packet corresponding to an individual optical transmitter and having different optical intensity, said optical signal packets being sequentially sent from said individual optical transmitters, said optical receiver including a bias source and a control circuit, said bias source outputting a variable output to said avalanche photodiode, said control circuit outputting a timing signal and a bias setting signal to said bias source, said method comprising steps of:
    preliminarily defining an optimum bias voltage and a sequence to transmit said optical signal packet from respective transmitters; and
    setting said bias setting signal to said bias source in synchronous with said timing signal,
    wherein said avalanche photodiode is biased in optimum with respect to each optical signal packet by said bias source.

6. The method according to claim 5, wherein
said bias source includes a plurality of voltage power supplies having different output voltages from each other, and
said bias setting signal selects, in synchronous with said optical signal packets, one of said voltage power supplies.

7. The method according to claim 5, wherein
said bias source includes a first voltage power supply and a second voltage power supply chosen by said timing signal, each voltage power supply outputting said variable output, said bias setting signal setting, during said timing signal choosing said first voltage power supply, said variable output of said second voltage power supply to be a predetermined voltage and, in synchronous with said optical signal packet, said timing signal choosing said second voltage power supply to output said predetermined voltage.

8. The method according to claim 5, wherein
said optical receiver further includes a first storage for storing a time schedule of said optical signal packets, and a second storage for storing said optical intensity of said optical signal packets, and
said control circuit generates said timing signal and said bias setting signal based on said time schedule and said optical intensity.

* * * * *